United States Patent [19]
Klein

[11] Patent Number: 5,809,338
[45] Date of Patent: *Sep. 15, 1998

[54] SYSTEM FOR TRANSFERRING A PLURALITY OF DATA SETS BETWEEN A PERIPHERAL AND A HOST INTERFACE UTILIZING DATA DRIVING CIRCUITRY STROBED BY HOST INTERFACE OR PERIPHERAL

[75] Inventor: Dean A. Klein, Lake City, Minn.

[73] Assignee: Micron Electronics, Inc., Nampa, Id.

[*] Notice: The term of this patent shall not extend beyond the expiration date of Pat. No. 5,685,012.

[21] Appl. No.: 868,820

[22] Filed: Jun. 4, 1997

Related U.S. Application Data

[63] Continuation of Ser. No. 164,288, Nov. 9, 1993, Pat. No. 5,685,012.
[51] Int. Cl.[6] ............................. G06F 13/04; G06F 15/16
[52] U.S. Cl. ......................... 395/855; 395/855; 395/834; 395/200.38; 395/500; 711/169
[58] Field of Search ................................. 395/834, 855, 395/856, 872, 200.38, 200.46, 200.49, 500; 711/169

[56] References Cited

U.S. PATENT DOCUMENTS

| | | | |
|---|---|---|---|
| 4,491,909 | 1/1985 | Shimizu | 364/200 |
| 4,527,233 | 7/1985 | Ambrosius, III et al. | 364/200 |
| 4,701,841 | 10/1987 | Goodrich et al. | 364/200 |
| 5,157,692 | 10/1992 | Horie et al. | 375/38 |
| 5,191,581 | 3/1993 | Woodbury et al. | 370/85.9 |
| 5,339,395 | 8/1994 | Pickett et al. | 395/325 |

*Primary Examiner*—Thomas C. Lee
*Assistant Examiner*—Rehana Perveen
*Attorney, Agent, or Firm*—Dorsey & Whitney LLP

[57] ABSTRACT

A method and system for increasing the rate of data transfer between a PC-based computer and an IDE/ATA-compliant hard drive is disclosed. Synchronous data transfer is employed in a manner that retains full compatibility with the existing IDE/ATA standard.

10 Claims, 10 Drawing Sheets

SYSTEM FOR TRANSFERRING A PLURALITY OF DATA SETS BETWEEN A PERIPHERAL AND A HOST INTERFACE UTILIZING DATA DRIVING CIRCUITRY STROBED BY HOST INTERFACE OR PERIPHERAL

This is a continuation of application Ser. No. 08/164,288, filed Dec. 9, 1993, now U.S. Pat. No. 5,685,012.

BACKGROUND OF THE INVENTION

1. Field of the Invention

The present invention relates to the field of computer interfaces, particularly those between a microcomputer and a peripheral device. The invention significantly improves transfer rates in standard interfaces while retaining compatibility with the existing standards.

2. Description of Prior Art

Known as the Integrated Drive Electronics (IDE) or the AT Attachment (ATA) interface, the traditional IDE/ATA disk-controller interface has long been the workhorse for mass storage in PC-based computers. This interface is being stretched to its limits, however, as new applications make increasing demands on mass storage devices. Next generation operating systems (e.g., Windows NT, OS/2, NextStep) and emerging multimedia applications have and will continue to require faster and faster mass storage devices.

Figure 1:
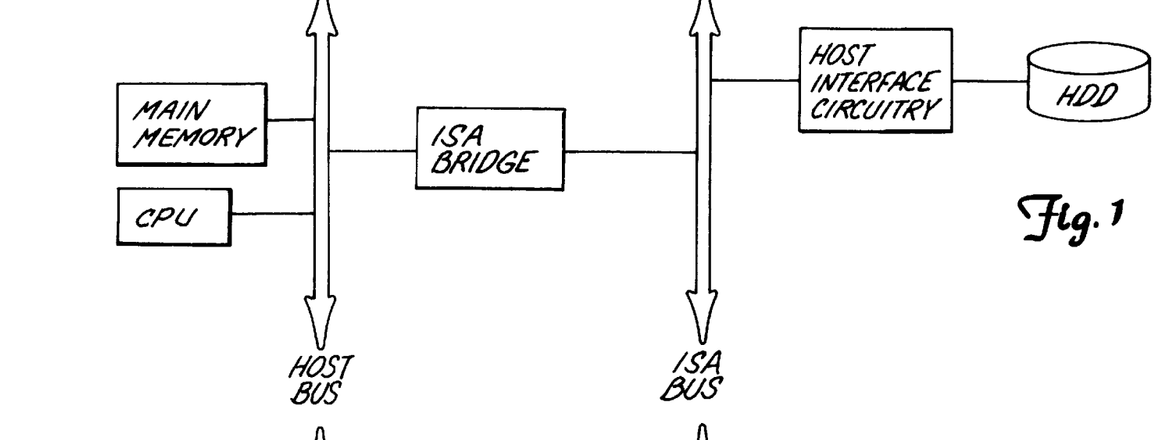
FIG. 1 shows a system block diagram for a computer with an ISA bus. A hard disk drive connected to the ISA bus.

Since the early days of the IBM PC, hard drives have existed only as I/O interfaced devices on the ISA (Industry Standard Architecture) bus. See FIG. 1. In such an implementation, the CPU transfers data by using input and output instructions. This method of data transfer is inherently slow.

Figure 2:
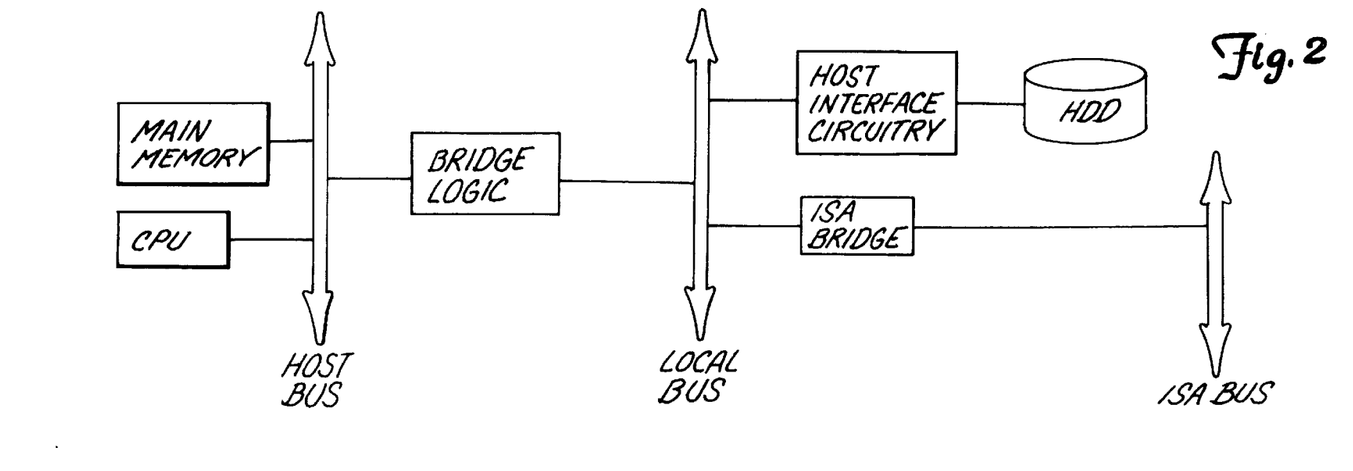
FIG. 2 shows a system block diagram with a local bus and an ISA bus. A hard disk drive is connected to the local bus.

The enormous increase in processor speeds in recent years has led to the widespread use of the local bus, an innovation that has emerged as a means of greatly enhancing the data throughput of I/O data transfers. The hard drive can be placed on the local bus (FIG. 2), thereby greatly increasing the speed of the bus to which the host interface circuitry and hard drive are attached. But other limitations prevent the hard drive from taking advantage of the increased bus speed in the local bus implementation of FIG. 2. For example, limitations of chipsets—the core logic of typical PC-compatible machines—slow the data transfer rate between the hard drive and memory, thereby preventing a higher data throughput. Also, the CPU in some cases will intentionally insert delays in write operations in order to prevent over-run of slower legacy devices. In other cases, inputs and outputs are delayed while the CPU processes I/O privilege checking.

Figure 3:
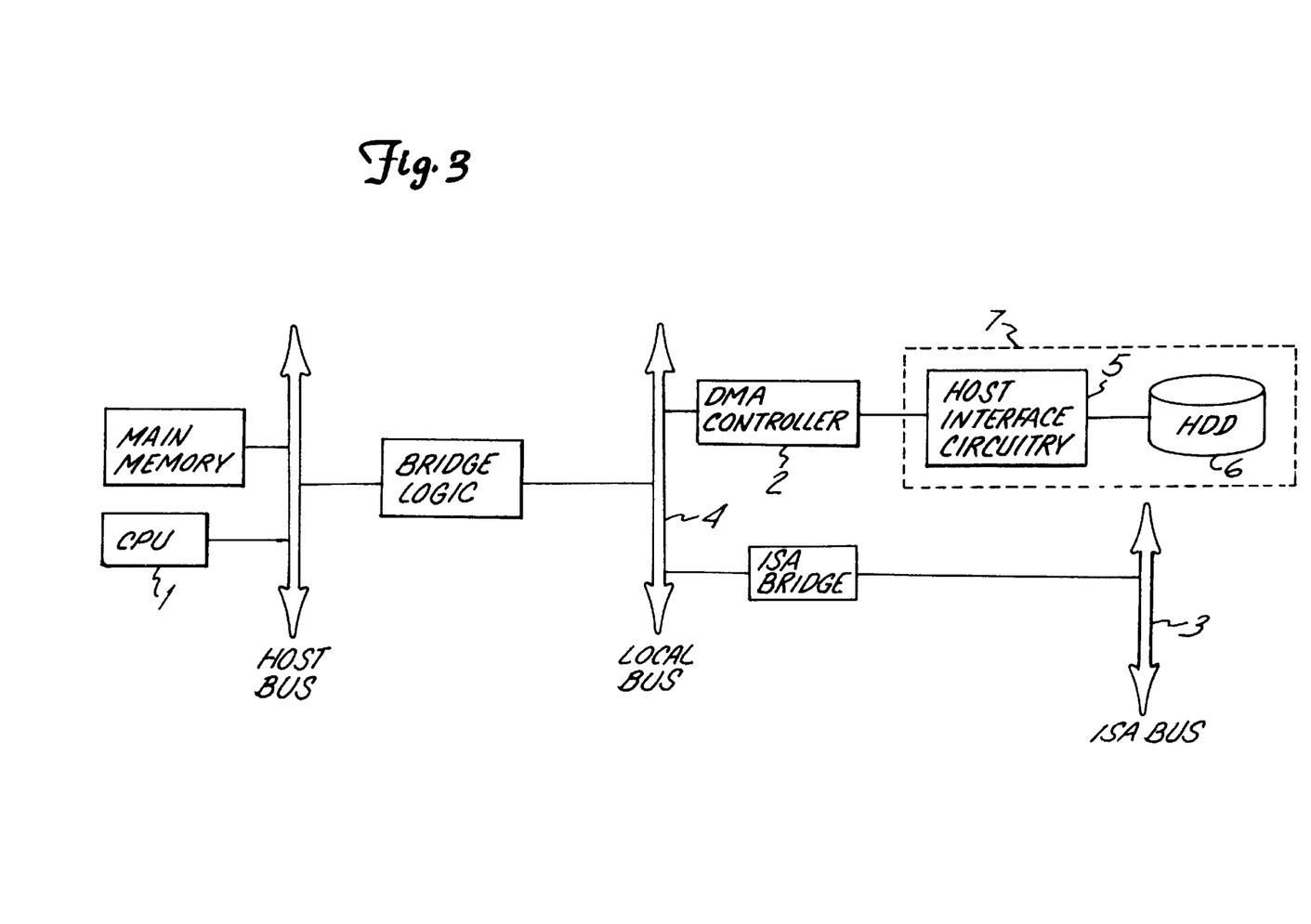
FIG. 3 shows a system block diagram with a local bus and an ISA bus. A DMA controller and a hard disk drive connected to the local bus.

These barriers to a high speed local bus implementation can be cleared to some degree by employing Direct Memory Access (DMA) to perform data transfers between the peripheral device and memory. See FIG. 3. With a DMA operation, the data transfer takes place independently of the CPU 1, and therefore many of the delays introduced by the CPU 1 and other logic are avoided. Typically, the DMA controller 2 resides on the ISA bus 3, but it can also reside on a VL, PCI, or other local bus 4 as shown in FIG. 3. A local bus DMA transfer is capable of being carried out at a very high rate. This rate is generally faster than the IDE/ATA disk controller interface 7 can support. The IDE/ATA disk controller interface 7 thus becomes a bottleneck in the implementation of FIG. 3.

What is needed, therefore, is a method for improving the interface 7 to eliminate the bottleneck involving the host interface circuitry 5 and the hard disk drive 6. Such a solution needs to retain full compatibility with the existing IDE/ATA interface standard so it may be implemented with existing interfaces, cabling, and software.

SUMMARY OF THE INVENTION

In one embodiment, the present invention is an accelerated interface that comprises host interface circuitry and a peripheral. During read operations, the peripheral drives both an IORead signal and the data to the host interface circuitry. The data is stored in a FIFO buffer, prior to being placed on the local bus. During write operations, the host interface circuitry drives both the IOWrite signal and the data to the peripheral.

It is an object of the present invention to increase the speed of data transfers between a peripheral device and a host computer over an interface that is compatible with the standard IDE/ATA disk controller interface.

DETAILED DESCRIPTION

The present invention is a method and system for accelerating data transfers between a host computer and a peripheral device. In the preferred embodiment, the invention is an addition or modification to the standard IDE/ATA interface that greatly enhances the data transfer rates between the host and an ISA-compliant peripheral, while maintaining full compatibility with the existing IDE/ATA interface. The present invention is then implemented in conjunction with a DMA controller on the host local bus to create a system for high speed data transfer to and from peripherals adhering to the IDE/ATA interface.

Figure 4:
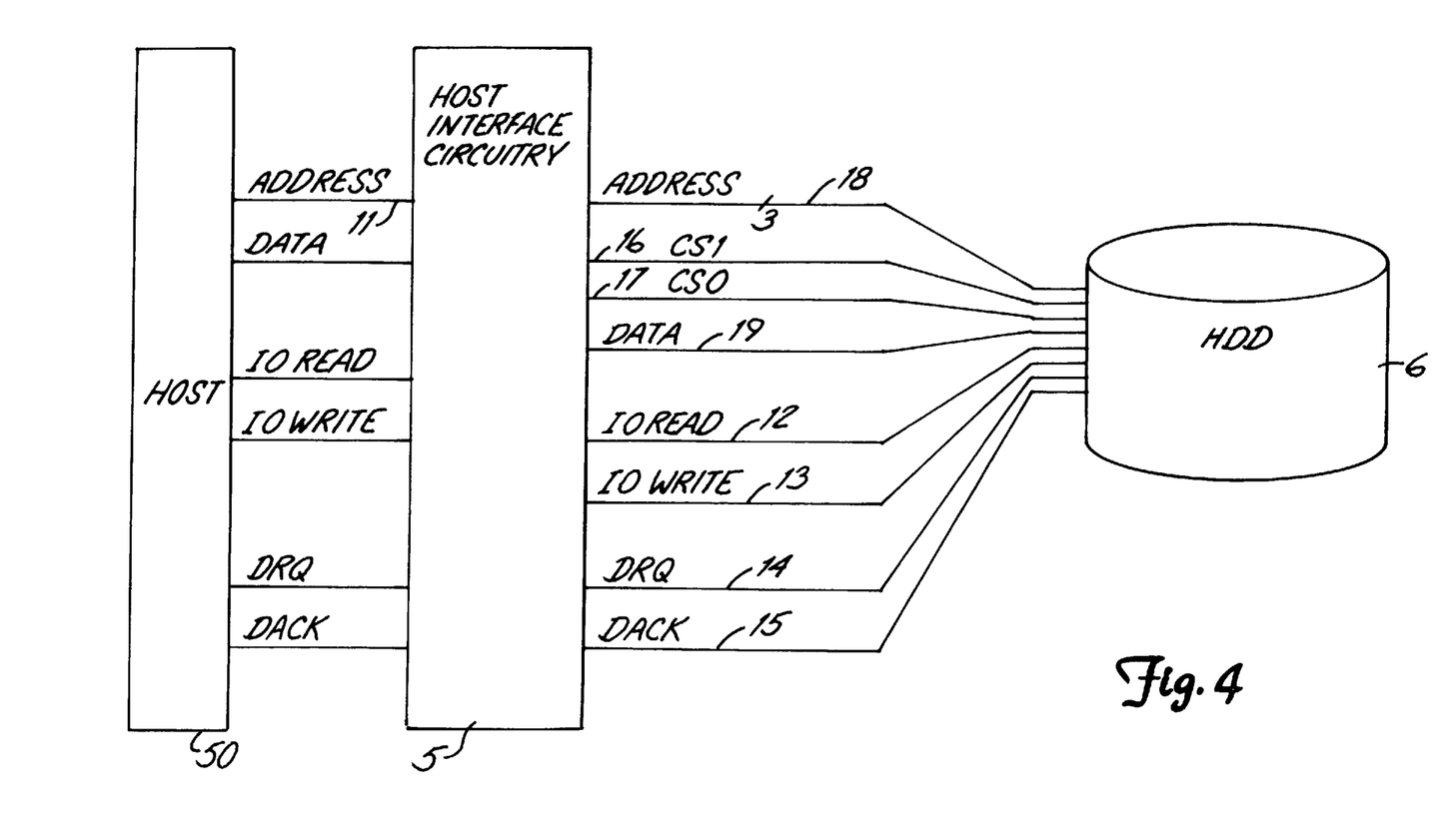
FIG. 4 shows the accelerated interface including host interface circuitry and an IDE peripheral.

FIG. 4 is an IDE/ATA disk controller interface circuitry showing the signals that are directly relevant to the present invention. A number of connections run between the host interface circuitry 5 and the HDD 6. These connections include data lines 19, IORead 12, IOWrite 13, DRQ (DMA request) 14, and DACK (DMA acknowledge) 15. The address 11 (from the host 50) is decoded into CS1 16 and CS0 17, and some address lines 18 are passed through the host interface circuitry to the HDD. In both the prior art and the present invention, an interface with these connections can be used to connect an IDE peripheral to an ISA bus or local bus.

In standard ISA bus operations, the host drives control signals, data, and commands over the host interface circuitry 5 to the peripheral (HDD) 6, signalling the hard disk drive 6 to send data to the host or to accept the data on the data lines 19. Read operations are defined as the transfer of data from the peripheral to the host, and write operations are defined as the transfer of data from the host to the peripheral.

Figure 5:
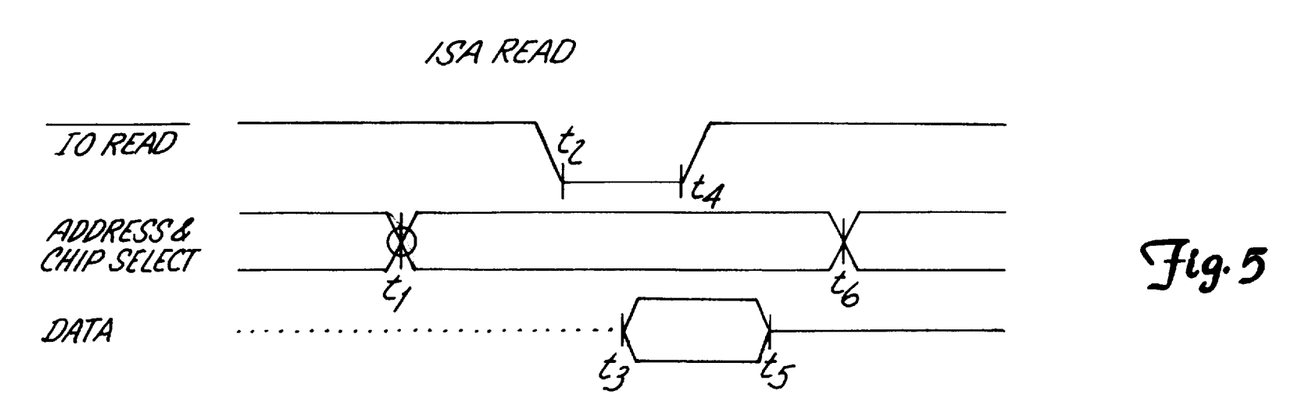
FIG. 5 is a timing diagram for a conventional asynchronous ISA read operation.

FIG. 5 shows a timing diagram for a conventional ISA (Industry Standard Architecture) asynchronous read operation. In an ISA read operation, the host drives the IORead signal, which gates data from the HDD onto the data lines 19. As shown in FIG. 5, the address and chip select become valid first at time $t_1$. Some time later, the IORead signal (the control signal) is asserted by the host at time $t_2$. The data, driven by the peripheral, then becomes valid at time $t_3$. At time $t_4$, the host de-asserts the read signal to terminate the transfer, and the HDD then takes away the data and tri-states the data bus at $t_5$. Sometime after $t_5$, the address and chip select can go away at $t_6$.

Figure 6:
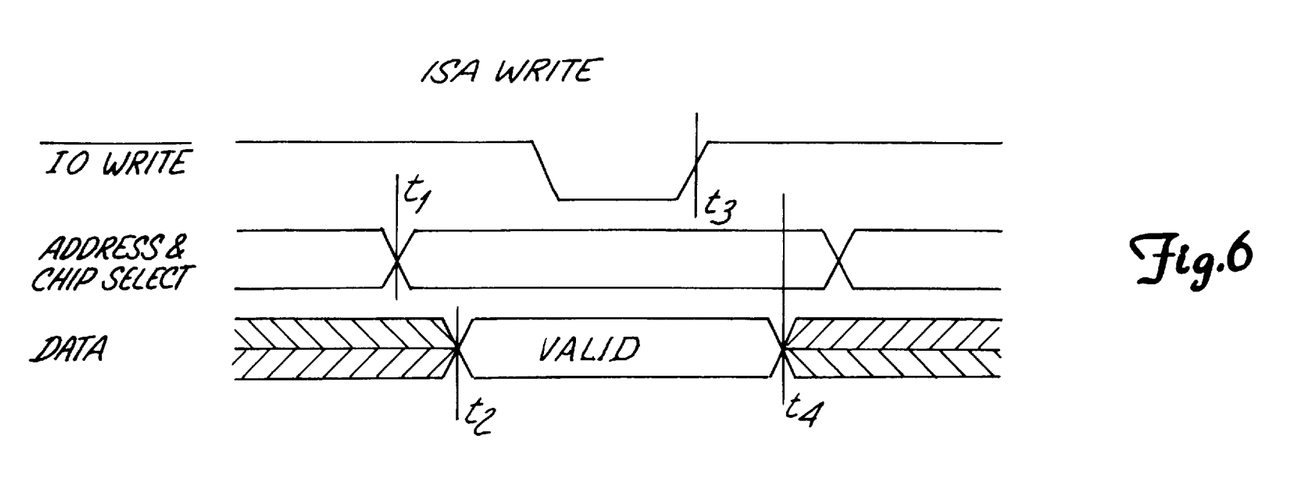
FIG. 6 is a timing diagram for a conventional asynchronous ISA write operation.

A standard asynchronous ISA write operation, in which data or commands are written from the host to the HDD, involves the host driving the IOWrite signal, which strobes the data from the host to the drive. FIG. 6 shows a timing diagram for a standard ISA write operation. The address and chip select become stable at time $t_1$, and the data may be driven at the same time or slightly later, at $t_2$. The IOWrite signal strobes the data from the data lines 19 to the HDD until time $t_3$. The data and control signals must remain valid until at least $t_4$, at which time these signals may change.

The ISA standard interface protocol requires that both the IORead signal and the IOWrite signal be driven by the host. This means that these signals must originate at the host, propagate from the host over the host interface circuitry 5, over the IORead line 12 (or IOWrite line 13), and to the HDD 6, where the HDD 6 finally receives and responds to the signal. The propagation of these signals takes time, which in turn significantly delays the read and write operations.

Figure 7A:
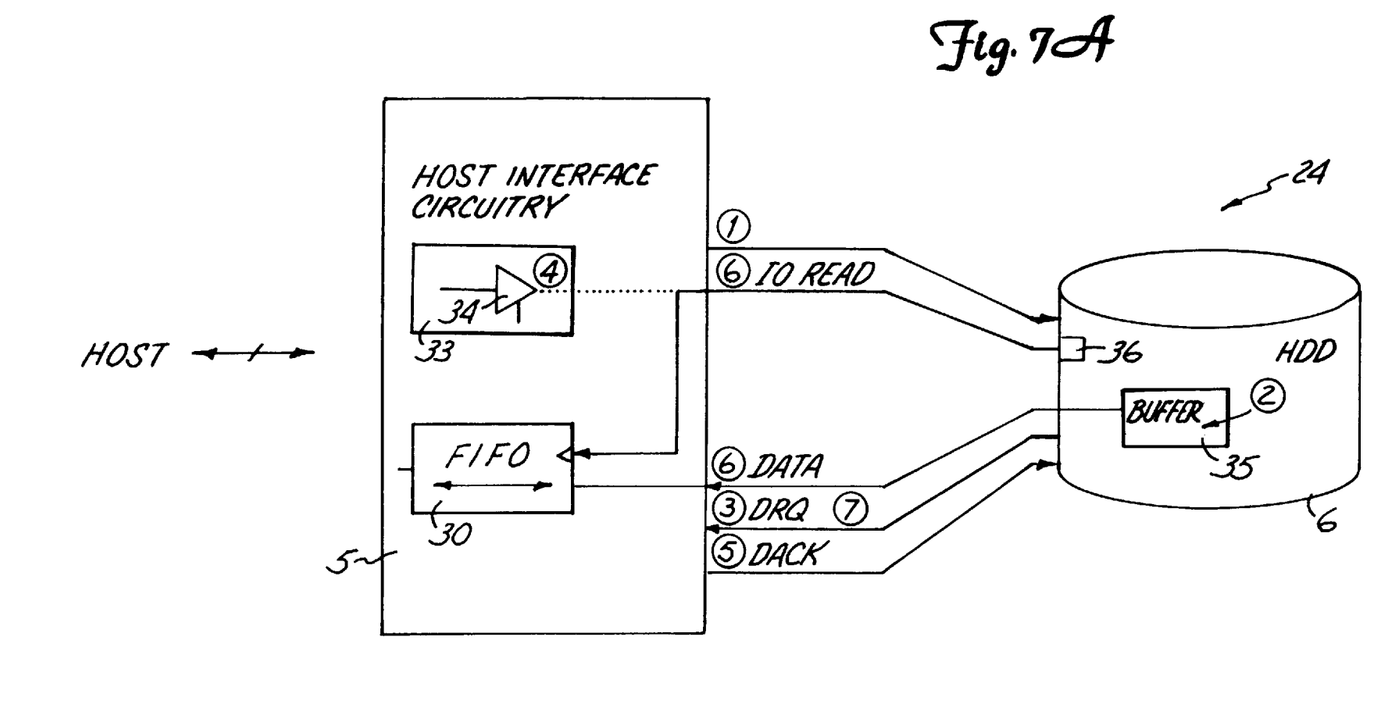
FIG. 7 is a block diagram and flow chart showing the steps carried out in an accelerate read operation as disclosed by the present invention.
Figure 7B:
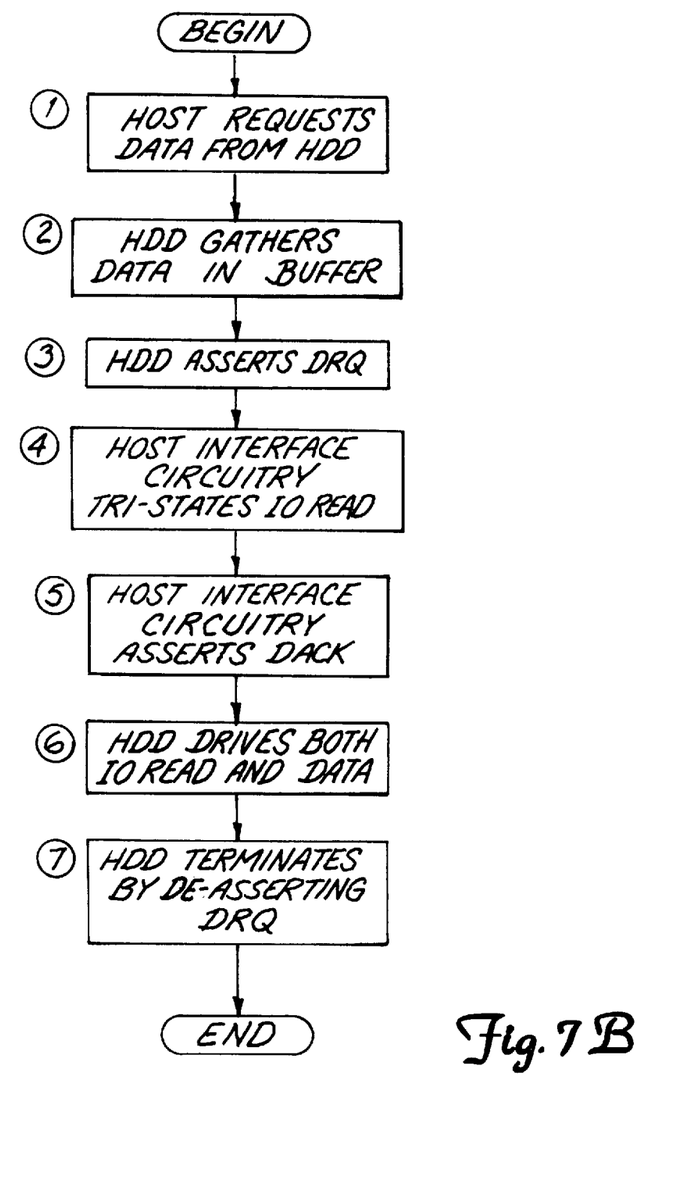

As shown in FIG. 7, the present invention is an accelerated interface 24 that reduces these delays so read and write operations can be carried out much faster than the conventional IDE/ATA asynchronous read and write operations. Yet full compatibility with the existing IDE/ATA interface, cabling, and software is maintained. The signals in the accelerated interface 24 fit within the standard IDE/ATA definitions of the signals even though these signals behave differently than the IDE/ATA standard.

FIG. 7 outlines the steps taken in a read operation according to the present invention. In the accelerated read operation, the host initiates the transfer by requesting a block of data from the HDD. This request step is carried out in the conventional asynchronous manner. The HDD responds by gathering the data in its buffer 35. Following the prior art protocol, the HDD would now wait for the host to drive the IORead signal. But with the present invention, the HDD instead at this point asserts the DRQ signal. The host interface circuitry responds by tri-stating IORead signal (via tri-state buffer 34) and asserting the DACK signal. The HDD then drives both the data and the IORead signal. The IORead signal is asserted for each word of data sent across the interface. Unlike the prior art, the IORead signal is driven by the HDD and the data transfer takes place in a synchronous manner. The host samples the data only on the rising edge of the IORead signal, thereby reducing the normal setup and hold times and reducing noise problems.

Figure 8:
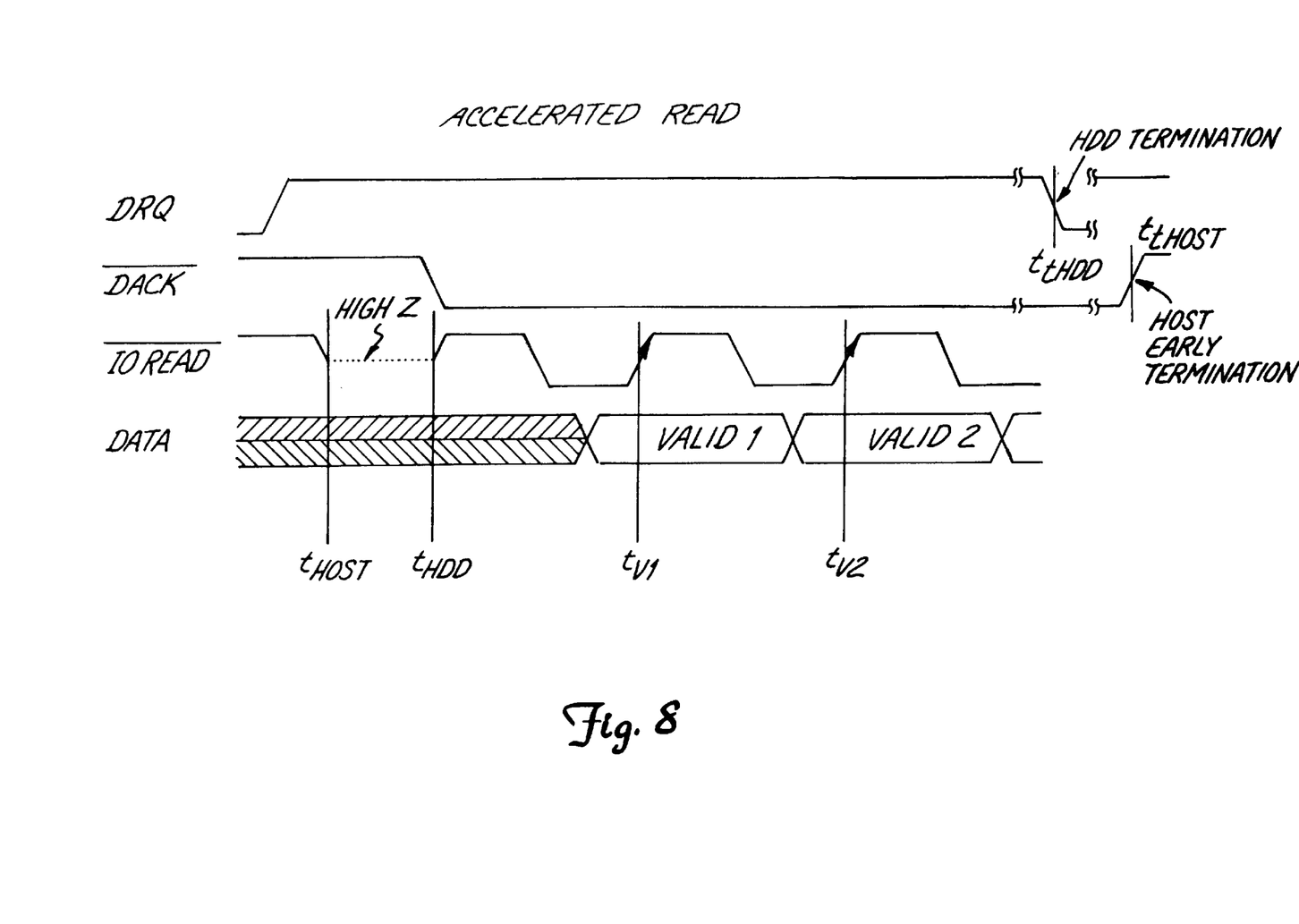
FIG. 8 is a timing diagram of an accelerated read operation as disclosed by the present invention.

FIG. 8 shows a timing diagram for the accelerated read operation. Until time $t_{host}$, the IORead signal is driven by the host. Sometime after the HDD asserts the DRQ signal, the host interface circuitry tri-states the IORead signal. The host interface circuitry then asserts the DACK signal at time $t_{HDD}$. Thereafter, the HDD drives the IORead signal, and data is sampled by the host interface circuitry on the rising edge of the IORead signal at $t_{v1}$, $t_{v2}$, etc. The data is transferred to the host interface circuitry in a burst of one or more words of data.

The speeds of the host local bus and the accelerated interface are different, so the accelerated interface may be able to write data to the local bus faster than the local bus can handle. To address this problem, the data received from the HDD is placed in a bidirectional FIFO (first-in first-out) buffer 30 in the host interface circuitry as shown in FIG. 7. This FIFO stores the data received from the HDD, and sends the data to the host (i.e., places the data on the local bus or in a DMA buffer) in a first-in-first out manner as the host (local bus) permits.

The burst operation shown in FIG. 8 is terminated when the HDD de-asserts DRQ. (Time $t_{thdd}$ in FIG. 8.) The host may also terminate the transfer early by de-asserting the DACK signal. (Time $t_{thost}$ in FIG. 8). By de-asserting the DACK signal, the host can control the speed of the transfer, and slow or stop the transfer when necessary. The host can also control the speed of the data transfer by de-asserting the IOCHRDY signal (I/O channel ready—not shown) until the host is ready to accept more data. The host may wish to terminate the transfer when the FIFO buffer is full or becoming full. The address lines could also be used to signal a complete or partial filling of the FIFO buffer. (The address lines are not required for the accelerated interface transfer, so they are available to be used for other purposes.)

The increased speed of the read operation is primarily the result of the HDD driving the IORead signal. In the standard ISA read operation, the host drives the IORead signal, and the time required for the IORead signal to propagate from the host, over the host interface circuitry 5, over the IORead line 12, and to the HDD is significant. When the HDD drives the IORead signal, as called for in the present invention, this delay can be eliminated, and the data rate can be bumped up substantially. With the prior art interface, the highest data rate may perhaps reach 20 MBytes per second. With the present invention, however, the data rate can easily reach 66 MBytes per second and higher.

Figure 9A:
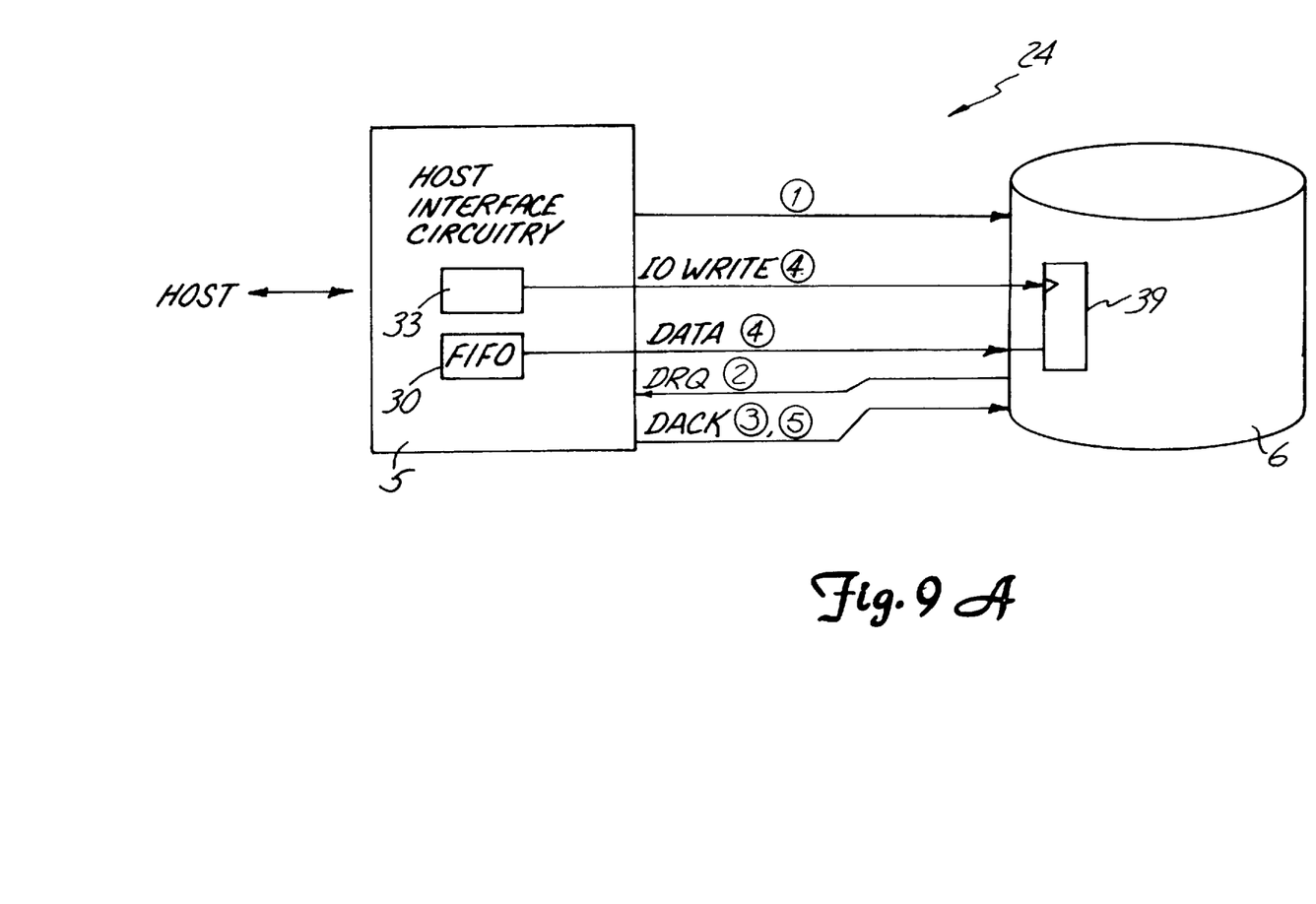
FIG. 9 is a block diagram and flow chart showing the steps carried out in an accelerated write operation as disclosed by the present invention.
Figure 9B:
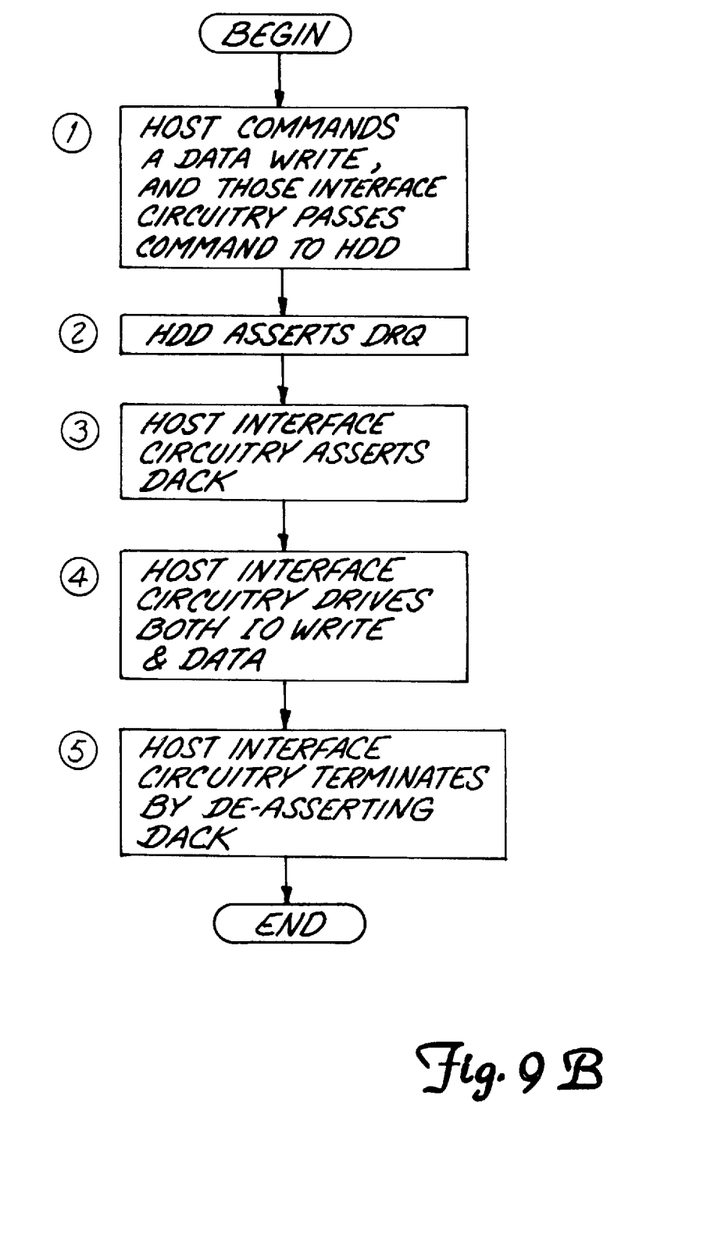

A write operation according to the present invention also provides significant performance benefits. FIG. 9 outlines the steps taken in the accelerated write operation: The host initiates a write operation transfer by commanding the data write operation to the HDD. This command is issued in the conventional asynchronous manner. The HDD then asserts the DRQ signal, and the host interface circuitry responds to this by asserting DACK. The host interface circuitry then drives both the data and the IOWrite signal, asserting the IOWrite signal for each word of data being sent across the interface. Unlike the prior art, the IOWrite signal is driven by the host interface circuitry (and not the bus bridge logic) and the data transfer takes place in a synchronous manner. The IOWrite signal acts as a clock for the data transferred to the HDD, and the HDD samples data on the interface with each rising edge of the IOWrite signal. See FIG. 10.

Figure 10:
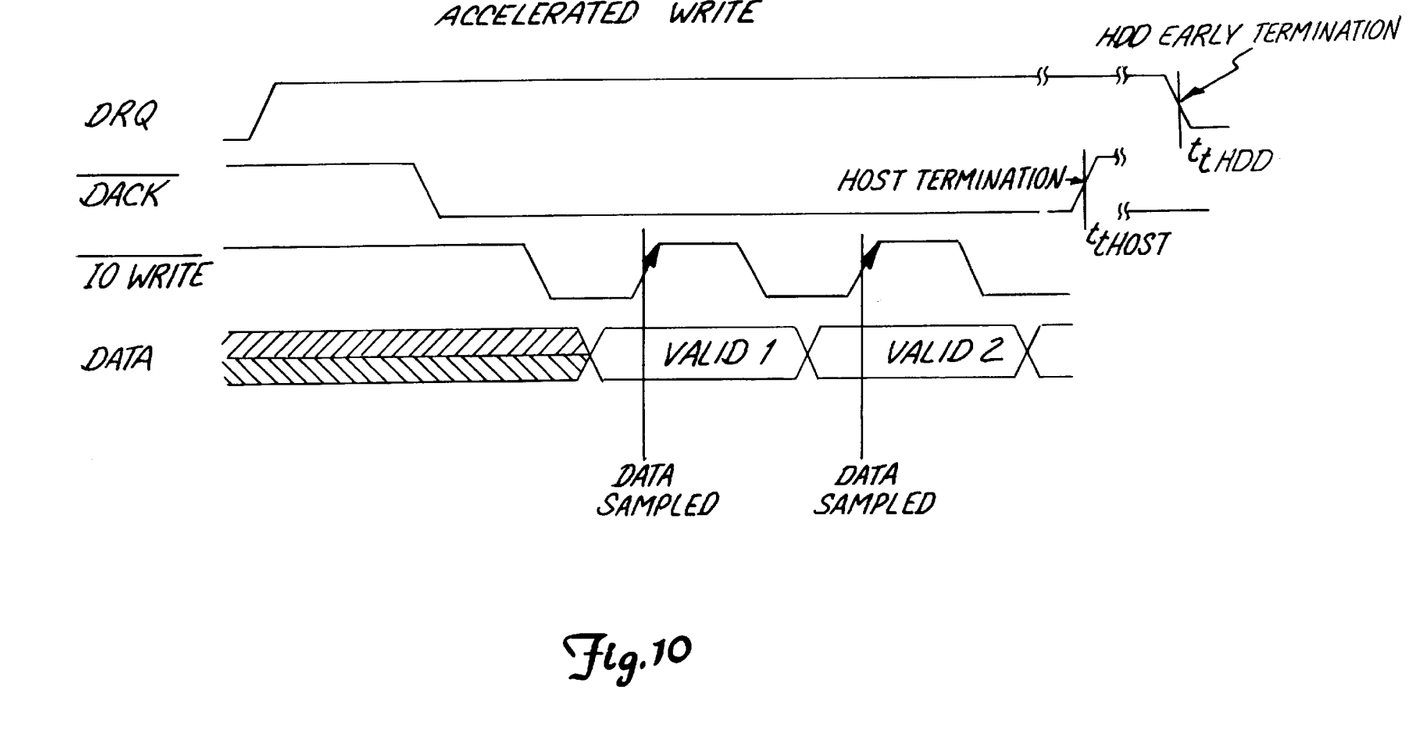
FIG. 10 is a timing diagram of an accelerated write operation as disclosed by the present invention.

The write operation is terminated when the host interface circuitry de-asserts the DACK signal. (Time $t_{thost}$ in FIG.

10). The HDD may also terminate the transfer early by de-asserting the DRQ signal. (Time $t_{thdd}$ in FIG. 10.) By de-asserting the DRQ or the DACK signals, both the host interface circuitry and the HDD can control the speed of the transfer, and slow or stop the transfer when necessary.

Choosing the size of host interface circuitry bi-directional FIFO buffer 30 involves both cost and performance considerations. In the context of a read operation, if the speed of the accelerated interface 24 is faster than the local bus, for example, the FIFO buffer 30 in the host interface circuitry will need to be large to accommodate the receipt of data from the HDD at a rate faster than the data can be written to the local bus. A large host interface circuitry FIFO buffer will enable the HDD to send data without interruption. But a large FIFO buffer may not be the most effective in terms of a cost/performance analysis. In some cases, a smaller FIFO may provide much of the speed benefit at a significantly reduced price. Similarly, in the context of a write operation, if the speed of the local bus is faster than the accelerated interface can handle, the FIFO buffer 30 located within the accelerated interface will need to be large to accommodate the incoming data. Again, however, the cost/performance trade-off must be evaluated, and the bi-directional FIFO buffer may ultimately differ in size from one computer to another. Another way of solving such a problem is slowing the CPU by insertion of CPU wait cycles or wait states.

To accommodate varying sizes of bi-directional FIFOs, the HDD should be capable of being programmed for a maximum read burst length. In such an embodiment, the HDD will send a burst during a read operation that is only as long as the maximum read burst rate, thereby assuring that the FIFO buffer will not overflow. Similarly, the host interface circuitry should also be programmable for a maximum write burst length, which represents the longest burst that the HDD will accommodate. Typically, data received by the HDD is placed initially in a buffer 39 as shown in FIG. 9. During a write operation the host interface circuitry will send a burst only as long as the maximum write burst length, thereby preventing data overrun.

The burst length for both the read and write operations can be determined by a negotiation process whereby the HDD and the host interface circuitry negotiate transparently to the CPU to determine a burst length that may be optimized for the hardware involved. A simple way to implement such a negotiation would be for the host interface circuitry to send data to the HDD, and the HDD to send data to the host interface circuitry, indicating the longest possible burst that each can handle. The host interface circuitry and the HDD then settle on the smaller of the two burst lengths. This negotiation can be done at system reset or prior to each read or write operation. Other techniques could be used, including a variation on the arbitration tree used in IBM's Micro Channel bus arbitration to determine bus priority. The arbitration tree would be used not for determining bus priority, but rather for determining an acceptable burst length. In another embodiment, the address lines may be used as a means of carrying out a dynamic arbitration of burst length.

It may be desirable to have maximum burst lengths that are different for read and write operations, so the maximum read burst length need not be the same as the maximum write burst length. Practical burst lengths are 1, 3, 4, 8, 16, 32, 64, 128, and 256 words, although others are possible. Even bursts as short as 2–8 words can provide significant performance benefits. (A word is defined as a stream of bits of any length.)

The rate of the data transfer itself can also be programmable. In such an embodiment, the HDD would be programmed to drive the IORead signal (and consequently, the data) at a given frequency. In one embodiment, the read data transfer rate can be programmed to match the local bus rate, thereby potentially eliminating the need for the FIFO buffer 30. Similarly, the host interface circuitry may be programmed to drive the IOWrite signal and the data at a given frequency. The rates of read and write data transfer need not be the same. It is conceivable that the host interface circuitry FIFO could be eliminated if the local bus speed were such that no storing of data coming from the bus needed to be done. This may be done by using CPU wait cycles to adjust the rate that data comes from the host.

In the preferred embodiment, the accelerated interface comprises the host interface circuitry 5 and the hard disk drive 6 (or other IDE peripheral). The invention is implemented by adding to, complementing, or modifying the existing IDE/ATA disk controller interface. The prior art host interface circuitry 5 is modified to provide means for tri-stating the IORead signal, and means for driving the IOWrite signal. Logic for providing these capabilities is well known in the art, and is represented by circuitry 33 as shown in FIGS. 7 and 9. The circuitry 33 can also act as a state machine. In addition, a bidirectional FIFO buffer 30 is required for sending data to the host, sending data to the HDD, receiving data from the host, and receiving data from the HDD.

Programming means for programming burst durations into the host interface circuitry and the HDD involves circuitry or logic known to those skilled in the art. Such means can include a programmable register, for example, but other possibilities are available. Similarly, programming means for programming burst rates, as described above, also involves circuitry or logic known to those skilled in the art. Programmable registers operating in conjunction with a variable frequency clock could be used to implement this programming means, but other implementations known to those skilled in the art could also be used. The entire host interface circuitry can be implemented in a low-cost ASIC.

The prior art IDE peripheral (HDD) is also modified so that it includes means for driving the IORead signal, and means for receiving the synchronous data transfer from the host interface circuitry during write operations. Driving circuitry 36 (FIG. 7) can implement the IORead driving capability, and a synchronous buffer 39 (FIG. 9) can be used to implement the means for receiving the synchronous data transfer from the host interface circuitry during write operations. Similarly, the circuitry 39 can be used to send the data to the host interface during write operations. Both the driving circuitry 36 and the synchronous buffer 39 can act as state machines. The additional hardware required in the HDD could also be implemented in an ASIC.

An important feature of the present invention is that host interface circuitry according to the present invention is still capable of operating with a conventional IDE peripheral, and a peripheral according to the present invention is still capable of operating with a prior art host that does not have the claimed host interface circuitry. Since full compatibility with existing standards is maintained, the components of the present invention can be mixed with prior art components without difficulty.

The present invention has been described in the context of an IDE hard disk drive, but the present invention is also applicable to any other peripheral that adheres to the IDE/ATA interface standard (e.g, CD-ROMs, tape backup units, hard disk cache controllers for IDE drives). Similarly, the present invention has been described in the context of an IDE/ATA disk controller interface, but the inventive concepts herein disclosed are equally applicable to other interfaces that adhere to similar interface protocol. Modifications made to such interfaces that are similar to those contemplated by the foregoing description lie within the scope of the present invention. And although the present invention has been shown and described with respect to preferred embodiments, various changes and modifications that are obvious to a person skilled in the art to which the invention pertains are deemed to lie within the spirit and scope of the invention as defined by the following claims.

What is claimed is:

1. A peripheral device comprising:

connection circuitry for connecting the peripheral device to host interface circuitry;

storage circuitry for storing data to be transferred from the peripheral device to the host interface circuitry; and data driving circuitry for transferring data from the storage circuitry to the host interface circuitry, wherein at one time the data driving circuitry drives a first set of data that is strobed by a first control signal generated by the host interface circuitry, and wherein at another time the data driving circuitry drives a second set of data that is strobed by a second control signal that is generated by the peripheral device.

2. The peripheral device of claim 1, wherein the peripheral device is an IDE/ATA-compliant peripheral device.

3. A method of transferring a plurality of sets of data between a peripheral and a host interface comprising the acts of:

reading from the peripheral a first set of data that is strobed by a first control signal generated by the host interface;

reading from the peripheral a second set of data that is strobed by a second control signal generated by the peripheral, wherein the first set of data is read at one time, and the second set of data is read at another time; and writing to the peripheral a third set of data that is strobed by the host interface.

4. The method of claim 3, wherein the act of reading from the peripheral a second set of data that is strobed by a second control signal generated by the peripheral includes the act of:

reading from an IDE/ATA-compliant peripheral.

5. Host interface circuitry comprising:

peripheral connection circuitry for connecting the host interface circuitry to a peripheral device, wherein the peripheral connection circuitry includes at least one clock signal; and reading circuitry for receiving data from the peripheral device, wherein the reading circuitry receives a first set of data clocked by a first signal from the host interface, wherein the reading circuitry receives a second set of data clocked by a second signal from the peripheral device, and wherein the first set of data is read at one time, and the second set of data is read at a different time.

6. The host interface circuitry of claim 5, wherein the host interface circuitry is IDE/ATA-compliant.

7. A method of transferring data between host interface circuitry and a peripheral comprising the acts of:

driving a signal to the peripheral to request a first set of data;

receiving the first set of data from the peripheral as the host interface circuitry strobes the first set of data with a first control signal;

driving a signal to the peripheral to request a second set of data; and receiving the second set of data from the peripheral as the peripheral strobes the second set of data with a second control signal, wherein the first set of data is read at one time, and the second set of data is read at a different time.

8. The method of claim 7, wherein the act of receiving the second set of data from the peripheral includes the act of:

receiving the second set of data from an IDE/ATA-compliant peripheral.

9. A computer system comprising:

a central processing unit including memory;

a peripheral device; and host interface circuitry connected to the central processing unit and to the peripheral device, and including (a) peripheral connection circuitry for connecting the host interface circuitry to the peripheral device, wherein the peripheral connection circuitry includes at least one clock signal; and (b) reading circuitry for receiving data from the peripheral device, wherein the reading circuitry receives a first set of data clocked by a first signal from the host interface, wherein the reading circuitry receives a second set of data clocked by a second signal from the peripheral device, and wherein the first set of data is read at one time, and the second set of data is read at a different time.

10. The computer of claim 9, wherein the peripheral device is an IDE/ATA-compliant peripheral device.

* * * * *